Nov. 16, 1937.  J. V. CAPUTO  2,098,952
APPARATUS FOR WELDING
Filed March 14, 1934  6 Sheets—Sheet 1

INVENTOR
James V. Caputo
by his attorneys
Byrnes, Stebbins & Blenko

Nov. 16, 1937.   J. V. CAPUTO   2,098,952
APPARATUS FOR WELDING
Filed March 14, 1934   6 Sheets-Sheet 2

Nov. 16, 1937.   J. V. CAPUTO   2,098,952
APPARATUS FOR WELDING
Filed March 14, 1934   6 Sheets-Sheet 3

INVENTOR
James V. Caputo
by his attorneys
Byrnes, Stebbins & Blenko

Nov. 16, 1937. J. V. CAPUTO 2,098,952
APPARATUS FOR WELDING
Filed March 14, 1934 6 Sheets-Sheet 6

Patented Nov. 16, 1937

2,098,952

UNITED STATES PATENT OFFICE 2,098,952

APPARATUS FOR WELDING

James V. Caputo, Crafton, Pa.

Application March 14, 1934, Serial No. 715,489

9 Claims. (Cl. 219—4)

My invention relates to the art of electric welding and, in particular, to the continuous welding of seams between abutting plate edges. It is described herein as applied to the welding of axial seam clefts in formed tube blanks, although it is not limited thereto.

It is recognized in the electric welding art that direct current is highly desirable for welding because of the uniformity and continuity of the weld produced thereby. Considerable difficulty has been experienced, however, in the generation, transmission and control of direct currents of the magnitude necessary to weld plate edges of substantial thickness at a high rate, for example, currents of the order of hundreds of thousands of amperes. Ordinary commutator types of direct-current generators are, of course, not well suited to the generation of such large currents. The transmission problems are complicated by the necessity for using massive conductors and the fact that a number of parallel circuits of different resistance may exist, giving rise to circulating currents or non-uniform distribution of current in the conductors resulting in excessive heating and losses.

The control of large direct currents has also been found difficult especially in the matter of initiating and terminating the flow of such heavy currents as are necessary in welding. The inductance of a circuit adapted for carrying large currents is necessarily considerable, while its resistance must be small unless excessive losses are to be incurred. These conditions, however, have necessitated considerable intervals of time for building up and terminating the welding current and have resulted in imperfect welds where the seam impedance varies for any reason. In continuous welding of tubes, for example, the practical success of any particular method or apparatus may be gauged rather well by the amount of end scrap loss, or the length which it is necessary to crop from each end of the welded article to remove the incompletely welded portion. It is necessary, furthermore, in contact resistance welding that the work be in engagement with the contact electrode before the welding current begins to flow, to prevent arcing and burning of the electrodes. For the same reason, the current must be terminated before the work leaves the electrode. In order to operate at high speeds, therefore, the welding current must be built up with exceeding rapidity and terminated in a similarly short interval of time when the welding has been completed.

It will be obvious from the foregoing that the requirements of a successful direct-current welder are more or less inconsistent and it has been difficult, impractical, or impossible, to provide equipment which would satisfactorily meet all the necessary requirements.

I have invented a method and apparatus for welding including a direct-current generator and a control and current supply system cooperating therewith, to apply direct current to continuous contact resistance welding of plate edges of substantial thickness at high speeds. The invention provides a satisfactory solution to the problem of generating, transmitting and controlling direct currents of large magnitudes for the purpose of continuous electric welding. The arrangement of the circuit between the generator and the welder is such that circulating currents are practically eliminated and a substantially uniform distribution of current in the various portions of the circuit is obtained.

Further features of my invention are the automatic control of the welding voltage, both during the performance of the welding operation and between successive operations. Other features of novelty will become apparent with the progress of the following description, which is to be read in connection with the accompanying drawings illustrating a present preferred embodiment of the invention together with certain modifications thereof. In the drawings:—

Figure 1:
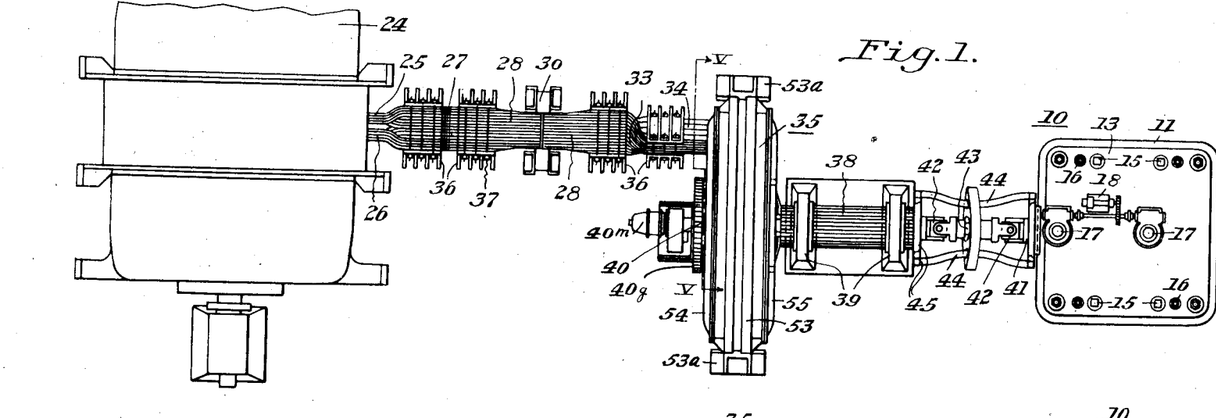
Figure 1 is a plan view, largely schematic, of the apparatus constituting the welding system of my invention.
Figure 2:
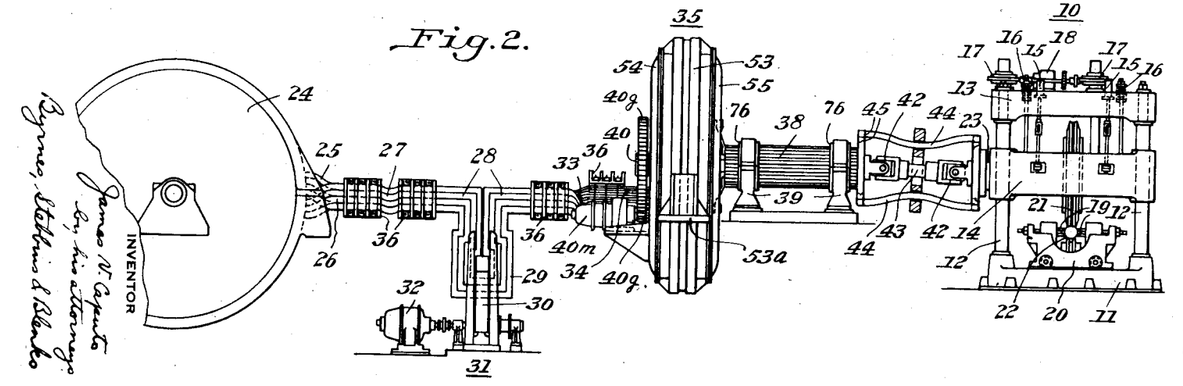
Figure 2 is a side elevation corresponding to Figure 1.

Referring now in detail to the drawings and, for the moment, to Figures 1 and 2, the invention includes an electric welder 10 having a base 11, columns 12 and a head 13. A carriage 14 is slidably supported on the arms 12 by a fluid suspension 15 and springs 16. The suspension 15 permits lifting the carriage above the limit of movement due to the springs. Screwdowns 17 for adjusting the carriage are driven by a motor 18.

Pressure rolls 19 are adjustably mounted in a base 20, which is itself capable of adjustment on the base 11. A welding electrode 21 is supported in bearings mounted on the carriage 14. The electrode is composed of insulated conducting discs adapted to engage the edges of an axial seam cleft in a formed tube blank shown at 22. The construction of the welder 10 and electrode 21 is more fully explained and claimed in my Patent No. 2,006,912.

A plurality of conductors extend axially from the electrode 21 through one of its supporting bearings 23. Alternate conductors engage opposite discs of the electrode and are insulated from the other disc.

Welding current is supplied to the electrode 21 through the aforementioned conductors from a generator 24. This generator is preferably of the homopolar type, as described and claimed in my Patent No. 2,005,609. The generator terminals are shown at 25 and 26 and each comprises a plurality of conducting bars of opposite polarity in interleaved relation. As shown in Figure 1, the individual conductors of the terminals 25 and 26 are interleaved and are fanned out a short distance from the generator. This permits the dimensions of the slip ring assembly to be kept to a minimum. By reason of the interleaving, adjacent bars are of opposite polarity, the conductors of one polarity being sandwiched in between those of the other polarity. Flexible connectors 27 join the bars of the terminals 25 and 26 to a plurality of bars 28 having a loop 29 formed therein. The loop 29 links the core 30 of a series compound exciter 31 driven by a motor 32, which will be explained more fully later.

Flexible connections 33 similar to those shown at 27 join the bars 28 to similar bars 34 entering a device 35, which I designate as a slip ring assembly, since it receives current from the stationary conducting bars 34 and delivers it to a rotating system including the electrode 21. The bars forming the terminals 25 and 26, and the bars 28 and 34 are firmly held together in proper relative position by clamps 36 having bolts 37 extending therebetween.

The slip ring assembly 35, which will be described in greater detail presently, delivers current to rotating conductors 38 rotatably supported in bearings 39. The conductors 38 and the slip rings of the assembly 35 are carried on a shaft 40. The shaft 40 is driven by a motor 40m through gearing 40g. A shaft 41 on which the electrode 21 and its supply conductors are supported, is coupled to the shaft 40 through universal joints 42 and a connecting shaft 43. The joints 42 permit the welder axis to be disposed offcenter with regard to the slip ring assembly axis, if desired. Connectors 44 extend between radial projections 45 on the conductors 38 and those extending from the electrode 21.

Figures 3, 4, 12:
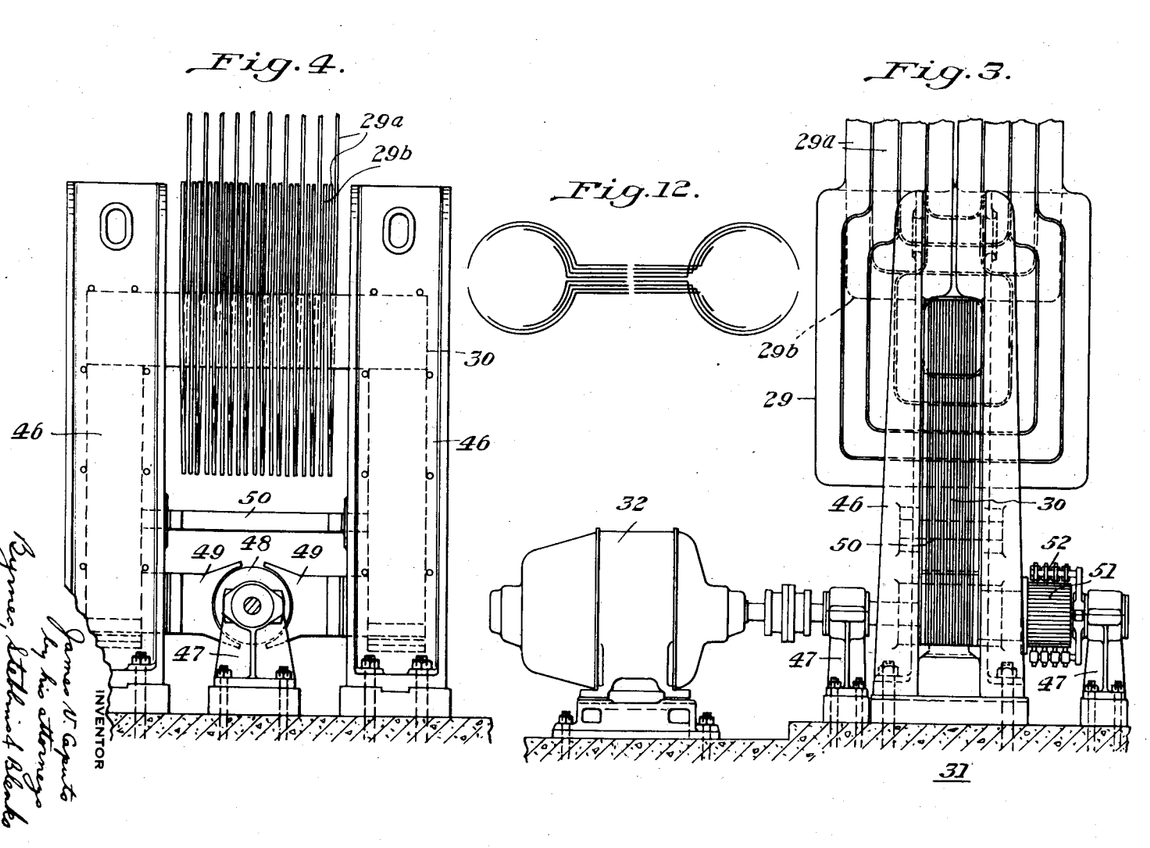
Figure 3 is a side elevation of a series or compound exciter for furnishing excitation to the main welding generator.
Figure 4 is an end view corresponding to Figure 3.
Figure 12 is a schematic diagram of connection of the welding circuit including the internal connection of the welding generator and slip ring assembly.

Referring now to Figures 3 and 4, the exciter 31, in addition to the windings 29 and core 30, comprises a frame 46, bearings 47 and an armature 48 rotatably supported thereon between pole pieces 49. A saturation bridge 50, which is simply a magnetic bar, extends between opposite legs of the rectangular core and is adjustable relative thereto to vary the amount of flux passing from one pole piece 49 to the other. Bars of different cross-sectional area will also be used to permit further control of the flux.

It will be apparent from Figures 3 and 4 that the bars 29a connected to the terminal 25, for example, extend around the horizontal portion of the core 30 in one direction, while the adjacent bars 29b connected to the other terminal 26, extend across the top of the core and around it in the opposite direction. In this way, both sides of the main circuit, that is, the conductor bars 29 of opposite polarity, are given substantially the same length and impedance, and a single-turn winding is provided for the core 30. The driving motor 32 requires no description since it may be of any desired adjustable-speed type, effective to drive the exciter armature 48 at a substantially constant speed when once adjusted. With the bars 29a and 29b disposed as described, the resulting magnetomotive force is in one direction only and the flux induced in the core 30 depends on the current traversing the bars. It will be apparent that by disposing certain bars of opposite polarity in the same direction about the core, their magnetomotive forces will be differential and they will contribute nothing to the excitation of the core. In this way, the desired excitation of the core for full welding current may be obtained. Further adjustment, of course, can be made by moving the saturation bridge 50, the position, area, and saturation of which determines the proportion of the core flux which is by-passed around the pole pieces 49. The exciter 31 is obviously a two-pole machine and its output is collected from a commutator 51 by brushes 52 in the usual manner.

Referring now to Figures 5 through 8, the slip ring assembly 35 comprises an annular yoke 53 having end bells 54 and 55 attached thereto. The yoke 53 is supported on feet 53a but may be rotated thereon to position the slip ring assembly at any desired angle relative to the shaft of the generator 24. The shaft 40 extends through the end bells coaxially of the yoke 53 and is provided with a spider 56. A plurality of slip rings 57 are carried on the spider 56 but insulated therefrom and separated by spacers 58.

Brush holder brackets 59 and 60 disposed back to back, are secured to but insulated from rings 61 carried by the end bells 54 and 55. The brackets 59 and 60 are separated by a thin layer of insulating material since they are connected to bars 34 of opposite polarity through connections which will soon be described. All the brackets 59 are of the same polarity and likewise all the brackets 60 and, therefore, the bracket 59 of one pair is of a polarity opposite that of the bracket 60 which it faces in the adjacent pair. Brush holders 62 and 63, having brushes 64 carried thereby, are secured to the brackets 59 and 60, respectively, of adjacent pairs. The brushes 64 on the holder 62 project between the brushes on the holder 63 and engage alternate slip rings 57 of opposite polarity. The engaging faces of the holders and brackets are serrated. The connecting bolts are not shown.

Risers 64a and 64b are connected to one of the brackets 59. The upper ends of these risers are attached to the outturned ends 65 of annular conducting bars 66, all the annular bars being interleaved and insulated so that adjacent bars are of opposite polarity. The outcoming leads from the generator are arranged similarly to the annular bars 66, as shown and claimed in my Patent No. 2,005,609 and, in order to provide equal impedance in all the parallel paths between the generator and the welder, I connect the short leads 66 to the long leads in the generator, and vice versa, as shown diagrammatically in Figure 12. It will be apparent that the lengths of the different leads 66 vary depending on where they are connected to the brush holder brackets. Risers 67a and 67b similarly extend from the brackets 60 to the outturned ends of the annular bars 66.

Figure 6:
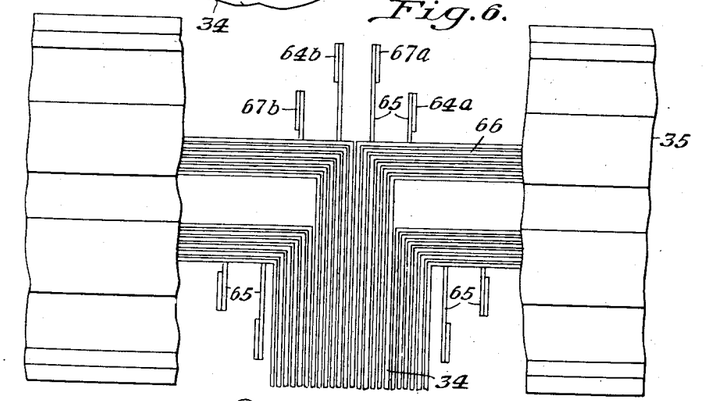
Figure 6 is a partial plan view of the slip ring assembly, with parts broken away for clearness.

The annular bars 66, as shown in Figure 6, are continuations of the bars 34, are supported in the yoke 53, and are insulated therefrom and from each other. The brackets 59 and 60 are insulated from the ring 61 and the bolts extending through the pairs of brackets and the risers connected thereto are insulated from both these elements. There is electrical engagement, of course, between each bracket and the risers extending therefrom.

Figure 7:
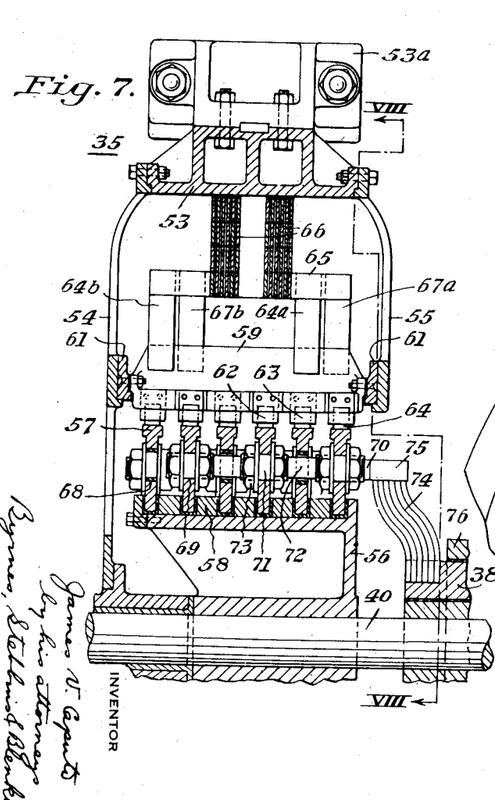
Figure 7 is a sectional view taken along a radial plane through the axis of the assembly of Figure 5.
Figure 8:
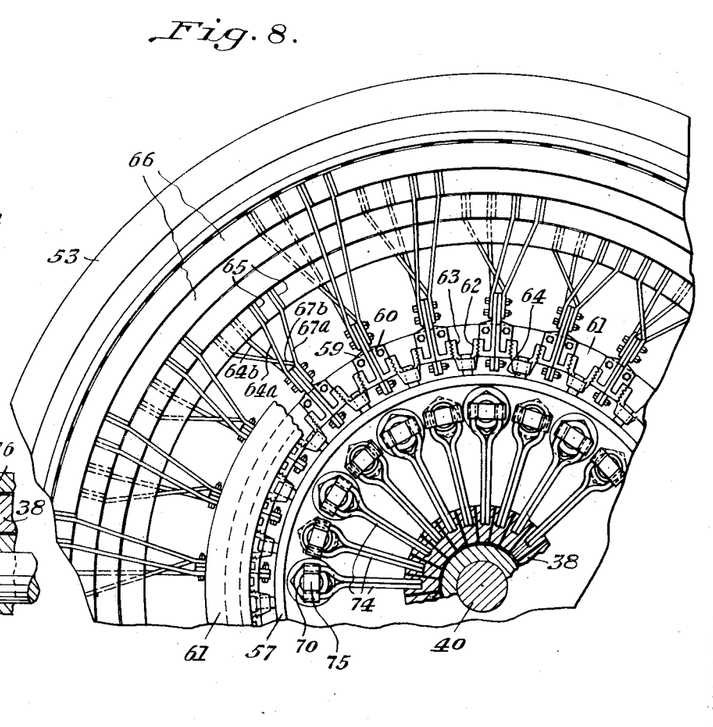
Figure 8 is a sectional view along the line VIII—VIII of Figure 7.

Each of the slip rings 57 has a row of peripheral holes alternately of different diameter, and adjacent rings are disposed so that their peripheral holes of different diameters are in alinement. In Figure 7, the left-hand ring has a plurality of large holes 68 therein. The next slip ring also has a plurality of large holes but between them, a series of smaller holes 69, the holes 69 of the second ring being in line with the holes 68 of the first ring. Bars 70 extend through the alined holes and slip rings and have enlarged portions 71 fitting tightly in the smaller holes and reduced portions 72 which pass through the small holes 68 with clearance. Insulating bushings are also disposed in the holes 68. Clamping nuts 73 threaded on intermediate portions of the bars 70 provide a good electrical connection between the bars and the alternate rings which they engage. It will be apparent that each bar 70 engages only alternate rings and that the next successive bar engages the other rings.

Flexible connections 74 extend from terminal blocks 75 on the bars 70 to the insulated conducting segments 38 extending axially of the shaft 40. A split ring 76 embraces the bars 38 and is insulated therefrom. The ring 76 is rotatably supported in one of the bearings 39. A similar ring 76 cooperates with the other bearing.

Figure 5:
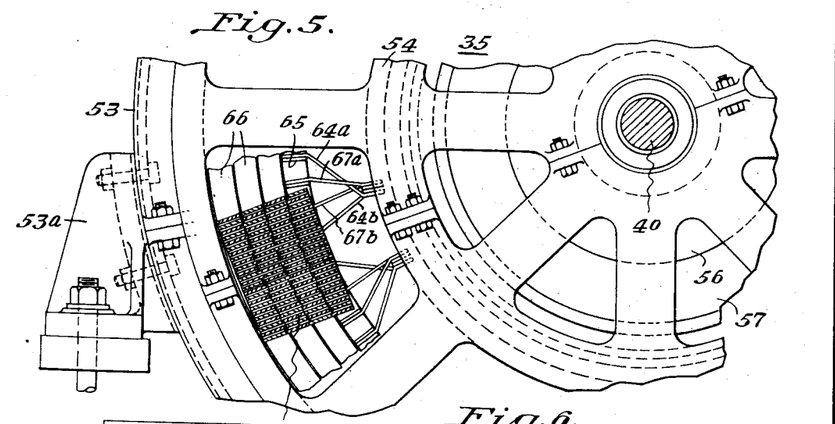
Figure 5 is a partial side elevation with parts in section, of a slip ring assembly disposed between the generator and the welder for conducting current from the fixed generator leads to the rotating welding electrode.

The radial projections 45 are similar to the connections 74 but are not flexible. The flexibility required between the shaft 40 and the shaft 43 is provided by the connectors 44. The conductors extending axially from the electrode 21 are similar to the bars 38 and pass through the left-hand electrode bearing in the manner described in connection with the bearings 39.

The features described above are claimed in my copending application Ser. No. 120,941, filed January 16, 1937.

Figure 9:
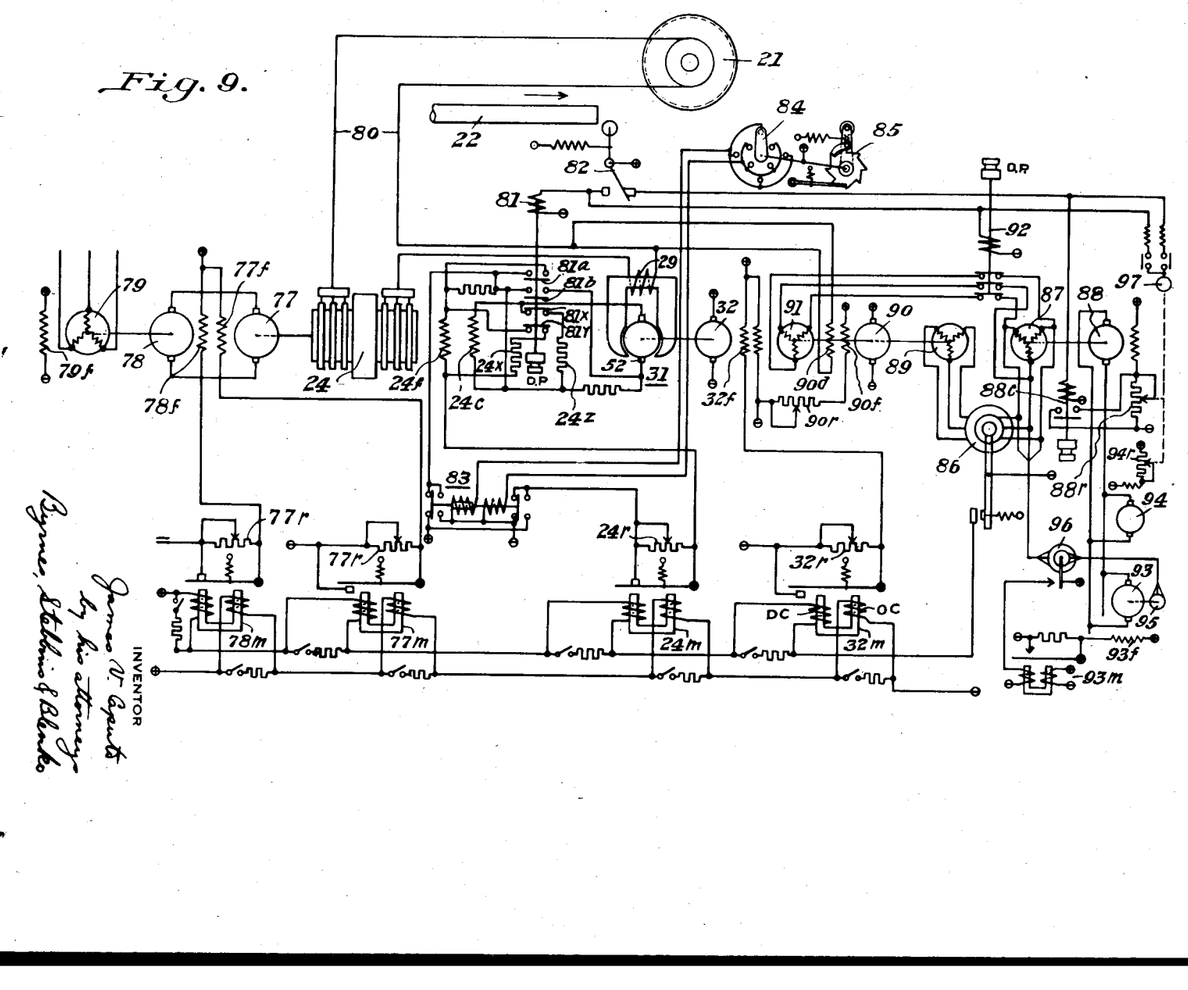
Figure 9 is a diagram illustrating the control system.

Referring now to Figure 9 for a description of the system for controlling the apparatus which has already been described, the generator 24 is driven by a motor 77. The motor 77 draws current from a generator 78, both being direct-current machines. The generator 78 is driven by a motor 79, preferably a synchronous, alternating-current motor. The generator 24 has a main field winding 24f and a compound field winding 24c. The motor 77 has a field winding 77f. The generator 78 likewise has a field winding 78f, while the field winding of the motor 79 is shown at 79f. The circuit connecting the generator 24 to the electrode 21 is indicated generally by the numeral 80, which includes the winding 29 of the series exciter 31. The brushes 52 of the exciter will be connected across the compound winding 24c by the closing of a contact 81b of a contactor 81. When the contactor is open as shown in Figure 9, a back contact 81x shunts the compound field winding 24c through a resistor 24z. The contactor 81 has a dashpot or other mechanism for introducing a slight time delay in the operation both in opening and closing.

The main field winding 24f of the generator 24 is also normally shunted across a resistor by a back contact of the contactor 81. The contact is shown at 81y and the resistor at 24x. The contactor 81 also has a contact 81a for connecting the field winding 24f to its source. The contactor 81 is controlled by a flag switch 82 in a manner to be described more fully later.

A reversing contactor 83 is connected in circuit with the field winding 24f. The field circuit also includes a control resistor 24r and a regulator 24m having an armature and back contact for shunting the resistor 24r.

The reversing contactor 83 is controlled by a rotary switch 84 which alternately engages spaced contacts arranged in concentric circles. The contacts of each circle are connected to one of the operating coils of the reversing contactor. The switch 84 is driven by pawl and ratchet mechanism 85 actuated by movement of the blank 22 through the welder. This mechanism reverses the polarity of the generator 24 every time a blank passes through the welder, and is described and claimed in my Patent No. 2,052,965.

The field winding 77f of the motor 77 is controlled by a regulator 77m similar to that shown at 24m except that the regulator 77m has a front contact adapted to be engaged by its armature. A similar regulator 78m controls the excitation of the field winding 78f of the generator 78. The field winding of the motor 32, shown at 32f, also has a control regulator 32m similar to the regulator 77m.

The regulators are of the Tirrill type and have operating coils OC and differential coils DC. The operating coils are connected in series to a constant voltage excitation source. The differential coils are connected in series to a contact of a relay 86, which will be described more completely later. Shunting resistors and switches are provided in the circuits of the operating and differential coils so that any regulator may be cut out of service without affecting the operation of the others.

The relay 86 is a frequency responsive device and may be likened to an ordinary induction motor with a wound rotor, except that the moving element of the relay is adapted to rotate through only a small angle. If alternating currents of identical frequency are supplied to the rotor and stator of the relay 86, there will, of course, be no torque on the moving contact thereof. Any difference in the frequency supplied to the rotor and stator windings, however, will cause movement of the relay contact in one direction or another, depending on which frequency is higher.

The moving element of the relay 86 is energized by a generator 87. The generator 87 is driven by a motor 88, which may be the motor driving the electrode 21, or a motor driven at a speed proportional to that of the electrode. The stator winding of the relay 86 is energized by a polyphase A. C. generator 89 driven by a variable speed motor 90, preferably a direct-current motor. This motor has a main field winding 90f and a differential field winding 90d. The winding 90d is connected across a portion of one side of the welding circuit 80 and, therefore, has impressed upon it a voltage proportional to the welding current. Since the winding 90d is a differential winding, the greater the welding current, the greater will be the speed of the motor 90, and vice versa. The setting of the field rheostat 90r controls the initial value of the welding current.

A motor 91 is also connected to drive the generator 89 at certain intervals, namely, between passages of successive blanks through the welder. At such times, of course, there is no welding current flowing and the tendency of the motor 90 is to slow down materially. The motor 91 is operated, however, to maintain the speed of the generator 89. The motor 91 derives current from the generator 87 when a contactor 92 is closed. This contactor is controlled by the flag switch 82 and closes its back contacts during the intervals between the passages of the successive blanks through the welder.

The relay 86 is controlled jointly by the speed of the electrode 21 and the magnitude of the welding current. These two factors, of course, must be properly correlated to produce uniform welding. If the electrode speed increases for any reason, the relay 86 is operated to increase the welding current, and vice versa. The same is true of an increase in the welding current. Suppose, for example, that the speed of the motor 88 increases due to an increase in the electrode speed for some reason. The relay 86 immediately operates to energize the differential coils DC of the regulators 32m, 24m, etc. The energization of the differential coil of the regulator 32m causes the armature of the regulator to be released and the shunt around the regulating resistance 32r to be opened. This decreases the excitation of the field winding 32f of the motor 32 and the motor, therefore, is accelerated to cause the exciter 31 to generate a greater voltage for exciting the compound field 24c of the generator 24. This, of course, increases the current supplied by the generator to the welder.

The regulator 24m is similarly operated to shunt the regulating resistor 24r and thereby increase the excitation of the main field 24f. The regulator 77m simultaneously decreases the excitation of the motor 77 by opening the shunt around the regulating resistor 77r and the regulator 78m increases the excitation of the generator 78 by shunting the control resistor 77r. All these operations, of course, tend to increase the welding current.

The increase in the welding current immediately causes an increase in the energization of the differential field winding 90d of the motor 90. This causes the motor 90 to accelerate. The frequency of the generator 89 is thereby increased and the relay 86 is caused to open its contacts. This brings about the reverse of the operations just described with a consequent lowering of the welding current and a resulting decrease in the speed of the motor 90.

It will be apparent that the relay 86 and the regulators controlled thereby vibrate continuously in normal operation but maintain average values of the several variables. It will also be apparent that the speed of any one unit of the system, the electrode motor 88, for example, may be manually controlled, and that all the other variables will immediately be altered in conformity therewith without further manual operation. This is particularly advantageous in controlling the speeds of the numerous auxiliary motors necessary for driving the forming, feeding and finishing roll stands which are usually embodied in the complete welder.

One such motor is shown at 93, as an example of the numerous motors which will usually be employed, all having control apparatus similar to that about to be described. The motor 93 may be assumed to drive a roll stand for feeding the blanks to the welder. It, as well as all similar motors including even the electrode motor 88, is supplied with energy from a variable voltage generator 94 driven by any desired source of motive power. The motor 93 drives a pilot generator 95 similar to the generators 87 and 89. A relay 96, similar to that shown at 86, has its rotor and stator windings connected respectively to the generators 95 and 87. The relay 96 controls a regulator 93m similar to the regulators already described. The regulator 93m controls the speed of the motor 93 by varying the excitation of its field winding 93f.

A motor 97 controlled by the flag switch 82, drives rheostats in the circuits of the field windings of the electrode motor 88 and variable voltage generator 94 in succession. The forward and reverse circuits of the motor 97 have limit switches therein for stopping the motor at the proper time.

A complete cycle of operations automatically effected by the movement of a blank through the welder will now be described.

The flag switch 82 engages its back (right-hand) contact until operated by an advancing blank to engage its front (left-hand) contact. When the flag switch engages its back contact, it completes a circuit for the motor 97 which shifts the field rheostat 88r to a position such as to cause the motor 88 to operate at minimum speed. At the same time, the rheostat 94r of the variable voltage generator is operated so that the generator voltage is at a minimum. In addition, a contactor 88c is energized to shunt the rheostat 88r. This causes the electrode motor 88 to operate at its lowest speed. As already explained, the speed of the electrode motor determines the excitation and speed of the generator 24 and also the speeds of all auxiliary motors, such as 93.

The contactor 92 connects the motor 91 to the generator 87 as long as there is no blank in the welder. This means that the relay 86 occupies a neutral position and the regulators, therefore, operate to lower the voltage of the generators and decrease the speeds of the driving motors.

At the same time, the contactor 81 causes the field windings of the generator 24 to be shunted across resistors.

When a blank advances toward the electrode and operates the flag switch 82, the contactor 92 disconnects the motor 91 from the generator 87 and thereafter, the motor 90 drives the generator 89 in accordance with the welding current supplied to maintain the proper relation between welding current and speed of travel of the blank. The flag switch also causes the contactor 81 to connect the field windings to their current sources. Under these conditions, the relay 86 operates the regulators to build up a normal welding current in the shortest possible time by accelerating all the driving motors and increasing the excitation of the generators. The motor 97 is energized to operate the rheostats 88r and 94r so that the electrode motor will accelerate and the variable voltage generator build up its voltage to the operating value. The contactor 88c is also energized to permit deceleration of the motor 88. It will be apparent that the entire system operates at relatively low speed during the intervals when there is no blank in the welder. As soon as the blank enters the welder, of course, the speed of travel of the blank is increased and the welding current is rapidly built up to the proper magnitude. The slowing down of the blank toward the end of the operation, insures the proper welding of the seam to the very end thereof, reducing the amount of end scrap loss. It will be apparent that the flag switch returns to its initial position shortly before the blank leaves the welder. This immediately causes a restoration of the initial conditions, a description of which it is unnecessary to repeat. The various control relays are timed by dashpots or other means so that the supply of welding current will not be terminated until just before the end of the blank leaves the electrode.

Figure 10:
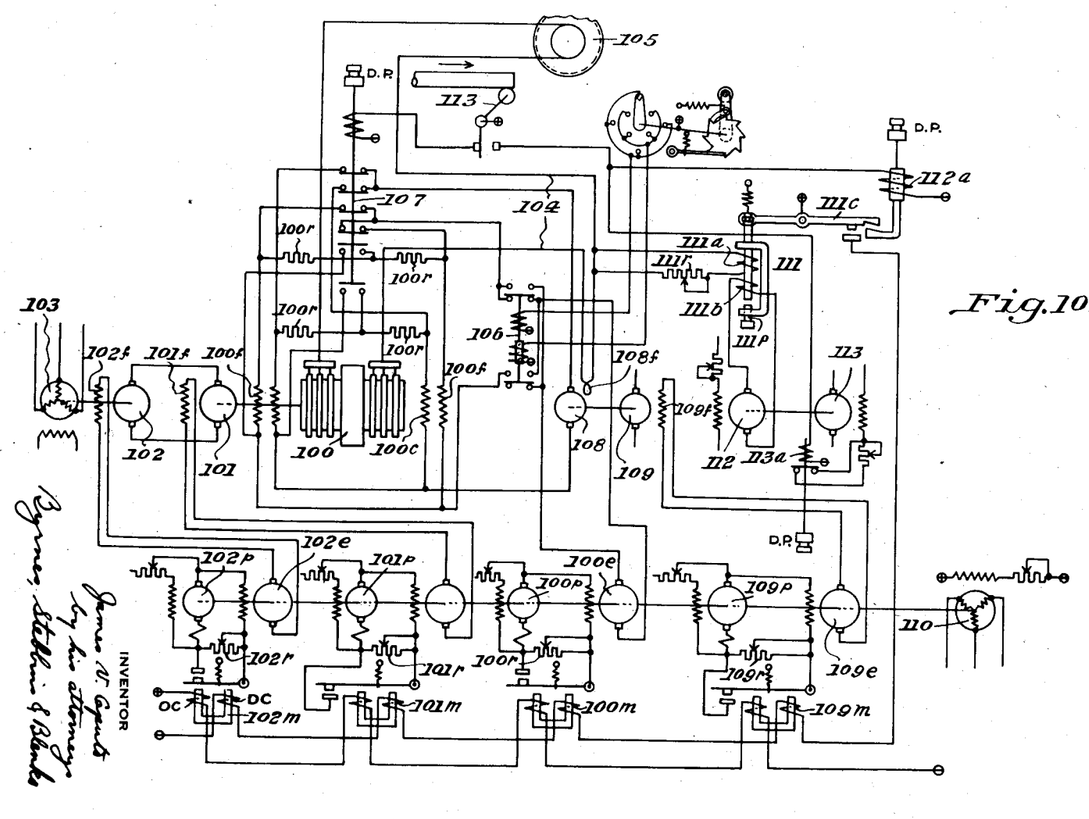
Figure 10 is a similar view showing a slightly modified form of control system.

Figure 10 illustrates a control system similar in certain respects to that of Figure 9. A homopolar generator 100 similar to that shown at 24, is driven by a motor 101. The motor 101 is supplied with current from a generator 102 driven by the motor 103. A main circuit 104 connects the generator to electrodes 105. The main field winding 100f of the generator 100 is divided into two portions which may be connected in parallel to an exciter 100e through a reversing contactor 106 and a field contactor 107. The two latter are similar to their counterparts in Figure 9. When the contactor 107 is energized, it connects the field windings of the generator 100 to their excitation sources directly. When the contactor is deenergized, the two portions of each field winding are connected in series with individual resistors 100r and a shunt is established connecting a point between the resistors to a point between the halves of the field winding to provide a separate discharge circuit for each portion of the field windings. A compound field 100c on the generator 100 is supplied by a series exciter 108 driven by a motor 109. The series field of the exciter 108 is located at 108f. The excitation and, therefore, the terminal voltage of the exciter 100e is controlled by a regulator 100m. This regulator is similar to those described in Figure 9 and controls the current delivered to the field winding of the exciter 100e by a pilot generator 100p. Similar main exciters, pilot exciters, and regulators are provided for the field windings of the motor 101 and the generator 102, and all these parts are numbered according to the same scheme. The regulators act in the same manner as already described to control the speed and excitation of the main motors and generators. A similar relay and exciter are shown for the motor 109. All the exciters are driven by a motor 110.

The operating coils of the regulators are designated OC and the differential coils as DC. The differential coils are controlled by a master relay 111. This relay has an operating coil 111a connected across a portion of one side of the main circuit 104 and a differential coil 111b connected across a direct current generator 112. The generator 112 is driven by the motor 113, preferably the electrode motor. The relay 111 has a U-shaped core with an adjustable pole piece 111p and a movable armature for swinging a contact arm 111c. It will be apparent that the relay 111 operates the regulators to maintain a desired relation between the welding current and the electrode speed, the same as in Figure 9. If the electrode speed increases, the differential coil 111b of the relay 111 demagnetizes the core and releases the armature so that the relay closes the circuit, including the differential coils of the regulators. The regulator 109m immediately decreases the excitation for the exciter 109e and the field winding 100f to accelerate the motor 109 and the compound exciter 108. A similar result is effected by the regulator 101m on the motor 101. The regulators 100m and 102m cause the excitation of the generator 100 and the generator 102 to be increased. All these operations tend to increase the welding current in accordance with increased electrode speed. The increase in the electrode current resulting causes increased energization of the coil 111a, which results in opening the circuit for the differential coils of the regulators. The relay 111 and the regulators continue to vibrate thus and maintain average conditions in accordance with the setting of the various control devices. The advantage of the system of Figure 10 is that the currents controlled by the regulators are smaller than in the case of Figure 9. The initial value of the welding current depends on the adjustment of the rheostat 111r.

A relay 112a is controlled by a flag switch 113 to prevent the relay 111 from operating the regulators when there is no pipe in the welder. A slowdown contactor 113a is also employed as in Figure 9.

Figure 11:
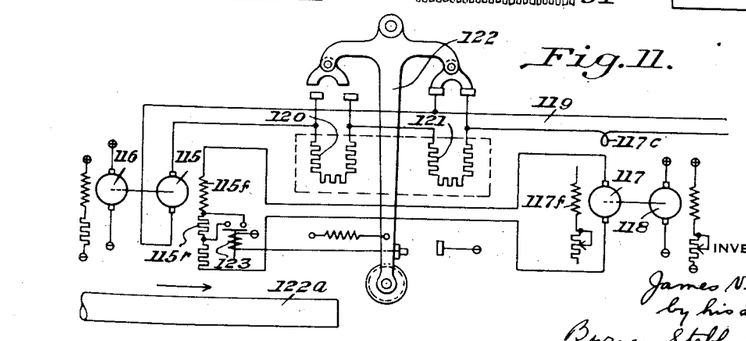
Figure 11 is a partial modification of the systems of Figures 9 and 10.

Referring now to Figure 11, I show a partial modification of my invention according to which I shunt the welding current into a resistor on termination of the welding and then reduce the welding current substantially. In Figure 11, a welding generator 115 is driven by a motor 116. The excitation of the generator 115 is supplied by an exciter 117 driven by a motor 118. The exciter 117 has a compound field 117c in series with the main welding circuit indicated at 119 and extending to the welder electrode (not shown). Resistors 120 and 121 are connected in the main welding circuit and are adapted to be automatically shunted during welding and connected in the circuit between welding operations. A switch 122 actuated by engagement therewith of the blank to be welded, effects the desired connection of the resistors. It will be apparent that the switch may be remotely controlled by means of a flag switch and suitable operating mechanism. When there is no blank in the welder, the switch 122 is in the position shown in Figure 11 and connects resistors 120 and 121 in series with the generator 115. Since the compound field 117c is thus shunted, the current delivered by the generator 115 is comparatively small, depending on the excitation provided by the shunt field winding 117f of the exciter 117. When a blank, such as 122a, engages the switch 122, the latter is shifted to shunt the resistor 120 and disconnect the resistor 121. At the same time, a resistor 115r, in circuit with the field winding 115f of the generator 115, is shunted by a relay 123 operated by movement of the switch 122, in an obvious manner. The increased excitation of the generator 115 causes welding current to flow to the electrode after the blank has engaged the latter and the compound field 117c of the exciter 117 further builds up the welding current. It will be apparent that the switch 122 will be disposed relative to the electrode so that the blank will have engaged the electrode before the welding current starts.

Just before the trailing end of the blank reaches the electrode, the switch 122 is released to restore conditions illustrated in Figure 11. The relay 123 being deenergized, reduces the excitation of the generator 15. The operation of the switch 122 shunts the compound winding 117c of the exciter 117 to further reduce the excitation of the field 115f of the generator 115. The switch 122 itself connects the welding generator to the resistors 120 and 121 in series and a comparatively small current continues to circulate therethrough until the next blank approaches the welder.

The resistors 120 and 121 may be composed of a plurality of skelp lengths and may be immersed in water for cooling. Obviously, the system of Figure 11 differs from those of Figures 9 and 10 in that the voltage of the generator 115 need not be reduced to zero immediately but may be reduced and built up between successive welds, the intermediate current traversing the resistors. The current may thus be brought up quickly to the required welding value. By adjusting the time at which the contact controlled by the switch 122 is closed, the generator may be caused to build up to substantially the full welding voltage before the switch 122 itself is operated. In other words, current almost equal in value to that required for welding may be circulated through the resistors just before the switch is operated to connect the welding electrode to the generator. Similarly, at the conclusion of the welding operation, the welding current is shunted through the resistor for the short instant before being reduced, as the trailing end of the blank leaves the electrode. More time is thus allowed for the necessary fluctuations in welding current without the necessity of slowing down the blank or incurring excessive end scrap loss. The automatic voltage control shown in Figures 9 and 10 may be applied to the generator 115 of Figure 11 in a similar manner.

It will be apparent that my invention is characterized by numerous advantages. In the first place, I have provided a simple apparatus for generating and transmitting direct current of the magnitude necessary for welding, characterized by ready accessibility to all parts for inspection or renewal. The various parallel circuits between the generator and the welder have substantially the same impedance, so there are no excessive circulating currents and the distribution of current in each conductor is substantially uniform. The entire slip ring assembly may be rotated on its supporting feet and can thus be accommodated to any particular location of the generator leads relative thereto and regardless of any difference in elevation between the generator and welder. The flexible connections between the welder and the current supply means permit considerable latitude in the location of both elements.

The series exciter provides compound characteristics for the main generator in a very simple manner and the degree of compounding may be readily adjusted to suit the various conditions by means of the saturation bridge and the disposition of the conductors of the exciting winding. The exciter driving motor, being adjustable for various speeds, provides further flexibility of control for the main generator excitation. The building up of the welding current and the determination thereof may thus be accomplished with great rapidity. The interleaving of the main conductors decreases the inductance of the circuit and further reduces the time characteristic thereof. The yoke of the slip ring assembly may be moved axially to permit access to the connections, by providing temporary support for the annular conductors connected to the brush holders.

Referring to the automatic control system, it provides for automatically slowing down the movement of the blank on leaving the welder and the automatic acceleration to operating speed on the entrance of another blank. Prompt increase in the excitation of the various generators and acceleration of the various motors is also effected automatically. In operation, the system effects an automatic control of the welding current to maintain a constant voltage drop across a certain portion of the main circuit. Proper correlation between the welding current and electrode speed is also obtained automatically. The polarity of the generator is reversed for each length of tube to be welded to insure equal wear on the electrode. The speeds of all auxiliary motors are controlled in direct conformity with that of the electrode motor, which may be manually adjusted. By using pilot exciters, the amount of current controlled directly by the regulators becomes very small.

By shunting the welding current through resistors during periods of building up and termination of the current, a satisfactory weld is assured at both extremities of a seam. This system does not cause objectionable arcing because a closed circuit is provided at all times either through the arc or through the shunt resistors.

While I have illustrated and described herein but one preferred embodiment of the invention with certain modifications, it will be apparent that numerous changes in the construction described and illustrated may be made without departing from the scope of the appended claims.

I claim:

1. In a welder, a generator, an electrode, a circuit connecting the generator and electrode, a regulator controlling the excitation of the generator, a motor driving the electrode, and means responsive to the speed at which the electrode is driven effective to modify the action of said regulator.

2. A current supply system for a welder electrode including a generator, a circuit connecting the generator and electrode, a motor for driving the generator, an exciter for the motor, means for regulating the excitation of the exciter to vary the excitation and speed of the motor, and means responsive to the voltage drop in a portion of one side of said circuit and effective to control said regulating means.

3. In a welder, a generator, an electrode, a circuit connecting the generator and electrode, a motor driving the generator, a regulator controlling the motor excitation, a motor driving the electrode, and means responsive to the speed at which the electrode is driven effective to modify the action of said regulator.

4. In a welder, a rotary electrode, a motor driving the electrode, a motor driving a welder auxiliary, a regulator controlling the excitation of the auxiliary motor, and means responsive to the speed of the electrode motor for modifying the action of said regulator.

5. The apparatus defined by claim 1 characterized by an exciter for the motor, said regulator being effective to vary the excitation of the exciter, to vary the excitation of the motor.

6. In a welder, a work-engaging electrode, a generator adapted to supply current thereto, a circuit connecting the generator and electrode, a resistor connected to said circuit, means for moving a work piece past the electrode for progressive welding, and means actuated by movement of the work in its path past the electrode for successively inserting said resistor in said welding circuit when the work moves out of engagement with the electrode, and removing it therefrom when the work moves into engagement with the electrode.

7. The apparatus defined by claim 6 characterized by means actuated substantially at the commencement and termination of the engagement of the work with the electrode for alternately increasing and decreasing the excitation of said generator.

8. A current supply system for a welder electrode including a generator, a circuit connecting the generator to the electrode, an exciter for the generator, means for regulating the excitation of the exciter to vary the excitation of the generator, means responsive to the voltage drop in a portion of one side of said circuit and effective to control said regulating means, and a lock-out relay operated by movement of the work after completion of the weld, effective to prevent said voltage-drop-responsive means from further modifying the action of the said regulator.

9. The apparatus defined by claim 6 characterized by means actuated substantially at the termination of the engagement of the work with the electrode for decreasing the speed of the welding generator.

JAMES V. CAPUTO.